(12) United States Patent
Lovizzaro

(10) Patent No.: US 7,556,156 B2
(45) Date of Patent: Jul. 7, 2009

(54) SECTOR FOR VACUUM ROTATING FILTERS AND SIMILARS

(76) Inventor: Paulo Eduardo Vasquez Lovizzaro, Rua Almirante Protógenes, 261, Apt. 52, 09090-760 Santo André- SP (BR)

( * ) Notice: Subject to any disclaimer, the term of this patent is extended or adjusted under 35 U.S.C. 154(b) by 385 days.

(21) Appl. No.: 10/554,519

(22) PCT Filed: Aug. 14, 2003

(86) PCT No.: PCT/GR03/00114

§ 371 (c)(1),
(2), (4) Date: Aug. 31, 2006

(87) PCT Pub. No.: WO2004/096411

PCT Pub. Date: Nov. 11, 2004

(65) Prior Publication Data

US 2007/0039869 A1 Feb. 22, 2007

(51) Int. Cl.
*B01D 33/23* (2006.01)
(52) U.S. Cl. ........................ 210/486; 210/347
(58) Field of Classification Search .......... 210/231, 210/346, 347, 486; 411/339
See application file for complete search history.

(56) References Cited

U.S. PATENT DOCUMENTS

| 4,077,887 A | | 3/1978 | Langvik | 210/331 |
| 4,608,164 A | * | 8/1986 | Neu | 210/231 |
| 4,666,596 A | * | 5/1987 | Oelbermann et al. | 210/228 |
| 5,143,500 A | * | 9/1992 | Schuring et al. | 411/339 |

* cited by examiner

Primary Examiner—Matthew O Savage
(74) Attorney, Agent, or Firm—Husch Blackwell Sanders Welsh & Katz

(57) ABSTRACT

A filtering sector (1) provided with two generating elements (2), obtained preferentially of polymeric material highly resistant to abrasion of mining products finely dispersed in the liquid filtrate, drained through the bi-foliar permeable film element (3), which covers the two grating elements (2), which are provided with lowered cylindrical holes (4) distributed along its extension, a par of grating elements (2) this one united through self-locking pins (5) which receives internally, through its frontal end, a locking counter-pin (11). Each grating element (2) formed by perimeter element (16) has a large edge (21) and, in the internal funneling of the grating elements (2), inserts (26), preferentially elastomeric or polymeric of high resistance to abrasion of the minerals finely disperse in the drained filtrate.

6 Claims, 6 Drawing Sheets

SECTOR FOR VACUUM ROTATING FILTERS AND SIMILARS

BACKGROUND OF THE INVENTION

The present invention is related to the enhancement of the film filtering sector, formed mainly by two semi-circular trapezium permeable overlapped and united perimetrally and internally parts provided in its vertex with a collecting cylindrical tube, which is coupled in the internal central axis of a cylindrical body integrating a vacuum rotating filter, belonging to the mechanical field, and to which it was given constructive original arrangement, aiming at enhancing its use and performance in relation to other models usually found in the market.

There is, therefore, within the referred patent request, a component especially designed and developed to obtain enormous practice providing great advantages in both, in its use as well as its durability of the filtering sectors.

It is yet, objective of the present request, to present an improvement of the filtering sector of the rotating filters with low costs to its industrial feasibility, however, connected to the requirement of robustness, safety and unit practice, offering thereby to the consuming public, an additional option in the similar market.

A number of separation and purification processes of substances and solutions are constantly executed, being pointed out within the main production phases in a hundred number of industrial segments.

Such separation and purification processes are based on the chemical-physical fundamental principles, among which: the precipitation: chemical reaction from which, as result it is obtained a product separated from the liquid where it is dissolved, as sediment; the flotation: process of solid particles concentration of different natures by the suspension in a liquid from which they are further separated; a filtration: passage of a liquid with solids suspended by something which retains these bodies.

Referring to filtration, as it is known, especially by experts in the subject, the separation of solid fraction of big volumes of solution requires the use of filtering elements solidary to high capacity filtering equipment associated to centrifugal, pressing and/or vacuum aspirators which, in a synergic way, promote the filtering with high efficiency.

The vacuum disc rotating filters, for instance, are widely used for draining liquids, separating efficiently the solid portion disperse in a solution.

In the present way, the rotating filters are constituted of several discoidal receptacles centrally crossed by a common tubular axle, being internally provided with tubular projections disposed and communicating with the inner side of the tubular axle, such projections which have thin filtering sector vertexes, each one formed mainly by two semi-circular trapezium permeable overlapped parts which are united perimetrally and median moved away by means of a suitable separator and with the same format, so as, when the space between the internal surface of the discoidal bodies and the external surfaces of the filtering sectors are filled in with a mixture of liquid and solid material, during the rotation downward to the tubular axle under the vacuum, the percolation of liquid fraction takes place through the filtering sector film, being addressed to the filtering sector vertex, entering the tubular axle.

This way, the solid material contained in the mixture remains accumulated outside the filtering sectors, in this phase, covered with a filtering fabric, being withdrawn each loop through the blown inverted process, forming the rotating filter operation cycle.

This way, such devices work in a continuous way and perform the filtering with efficiency, however, there are some drawbacks in relation to the limited durability of the thin filtering sectors, when they are used to separate very abrasive solid materials.

Concurrently to that, there is the perimeter wearing out, for instance, by the fact that it deals with an area of folding the permeable parts and, consequently, more susceptible to the hydrostatic and mechanical pressure of the solid material particles to be retained.

An example of application of high abrasive material is in the mining area, where the vacuum rotating filters are used to filter and separate several minerals extracted from deposits.

Other limitation is owing to the wearing out of parts of the internal lap disposed in the vertex of the thin filtering sectors and from the separator between the parts, owing to the constant traffic of abrasive powdery material which is carried together with the filtered liquid, causing the rupture of the nozzle at the filtering time, or the separator's rupture, which is outstood from the central portion, going toward the filtered liquid output.

Yet, another inconvenient which is observed in the thin filtering sectors is the loss of filtering area owing to the formation of an impermeable film from the splice of the thin filtering sectors. Such splice, when allowing the insertion and the consequent accumulation of very thin particles, produce a pie firmly anchored, favoring the germination of thin filtering sectors, thereby lessening the filtering contact area of the said thin filtering sectors.

It was thinking on this inconvenient that, after a plurality of researches and studies, the inventor, person involved in this kind of business, has created and developed the present patent's object, idealizing a filtering sector provided with a blocked area around its perimeter, enhancing the efficiency of discard of the filtered pie or paste, owing to the non-formation of pie in this area with its rounded corners or edges, enabling a longer useful life of the filtering fabric which, usually suffers a bigger friction in this area, owing to the corners of the traditional models and also avoiding the formation of an impermeable film from the splice between the thin filtering sectors, which lessen the filtering contact area of the thin filtering sectors.

SUMMARY OF THE INVENTION

In addition to that, the present patent contemplates enhancements in the separating devices and of the tubular conic tubular segment, contained on the trapezoidal top of the separating device, together with the self-blocking device, which fixes two semi-circular trapezium permeable semi-parts, overlapped bound in a perimetral and internal way.

This way, the present enhancement shows that not only the mechanical and functional qualities have been considered in the project of its manufacturing, but also the form, the displacement and the location of its parts and components which, correctly positioned, have brought an increase in efficiency without any charge.

Thus, the present patent has been designed aiming at obtaining a utensil with less number of possible parts, conveniently configured and arranged to allow that the thin permeable filtering sector, manufactured in plastic material, perform its functions with incomparable efficiency and versatility, without the inconvenient already mentioned.

It presented in the patent request, a practical and innovating model of thin permeable filtering sector with all aesthetical and functional qualities, designed and developed according to the most modern techniques, enabling this way, its most varied usage.

Its innovating format allows the obtaining of an excellent level of functionality, offering a model of thin permeable filtering sector, which has high durability, having being created, mainly, for lessening the number of stoppages for maintenance or exchange of filtering sectors and filtering fabrics covered in it, avoiding the retention of a wide stock of replacement parts, at the same time, manpower costs are optimized.

The utensil configuration, object of the present patent, in its new constructive form, comprise a filtering sector constituted of two generating elements, preferentially of polymeric material highly resistant to abrasion of mining products finely dispersed in the drained filtrate through the bi-foliar permeable peculiar element, which covers the grating elements, being that the grating elements are provided with lowered cylindrical holes distributed along its extension, by where they are mutually united through self-locking pins, constituted of a perforated cylindrical base and internally lowered from where it is raised a perforated cylindrical body of smaller diameter, being that the lower perimeter contains four reinforcing saliencies and the upper part provided with a conic ring and longitudinal split in four quadrants by means of splits, in addition to a cylindrical elevation, upward from the upper end of each formed quadrant and, self-blocking pin receives in its upper part a blocking counter-pin, constituted of a cylindrical base from where a massive cylindrical body of smaller diameter is raised, being the upper portion provided with a conic ring and longitudinal and centrally split in two semi-portions by means of a split.

Each grating element is formed by a perimetral element, containing medianly solidary a grid of diagonal segments which have next to its surface an extended wavy body of longitudinal form, by means of rectangular elevations of rounded corners, forming a gallery which, together, occupies the whole interstitial space of grating element.

The perimetral element is wedged solidary and perimetrally by a large edge, in unique body with the triangular portion, solidary in turn to a semi-tubular segment, through which the set is fixed in the perforated cylindrical element of rotating filter, being that in the internal funneling of the grating elements there are inserts displaced, preferentially elastomeric or polymeric of high resistance to abrasion of minerals finely disperse in the drained filtrate, being that such insert contains brims in its sides and reticular veins in its lower portion surface, coincident to the reticulate fitting contained on the internal surface of the triangular portion.

This way, several filtering sectors are radially fit around the rotating filter tubular axle granting a clover format with several "petals" leaned among themselves, forming a single disc.

The insert, placed in a strategic position, has the function of avoiding abrasion in that place and guides the percolate liquid through galleries of the grating element into the semi-tubular segment, which in turn forwards the same liquid into the tubular axle of the filtered liquid collection.

It is understood that this way, the referred device is extremely simple in its construction, being, however, of easy feasibility, however, excellent practical and functional results are kept, offering an innovating constructiveness on the known models.

Idealized with innovating drawing, it results into a harmonic set, of very peculiar aspect and, above all, characteristic, being that, in addition to the constructive aspect, the model is outstanding by its usage versatility and facility.

DESCRIPTION OF THE FIGURES

Following, for a better understanding and comprehension of how the "SECTOR FOR VACUUM ROTATING FILTERS AND SIMILARS", which is hereby claimed, present the enclosed illustrative drawings, where it is read:

DESCRIPTION OF THE INVENTION

Figure 1:
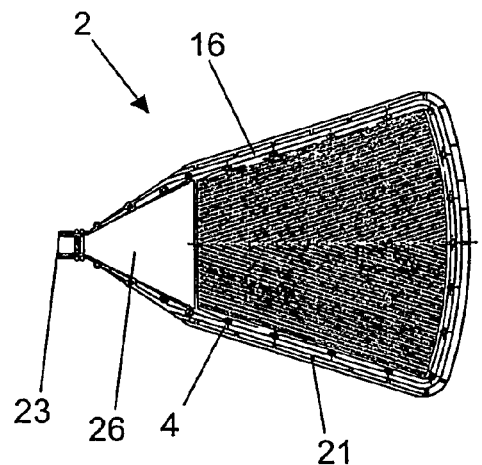
FIG. 1—Shows an internal upper view of the grating element
Figure 2:
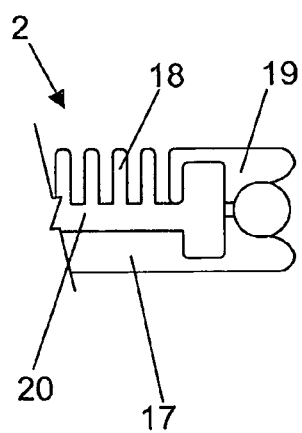
FIG. 2—Shows a blown cut view of the grating element side.
Figure 3:
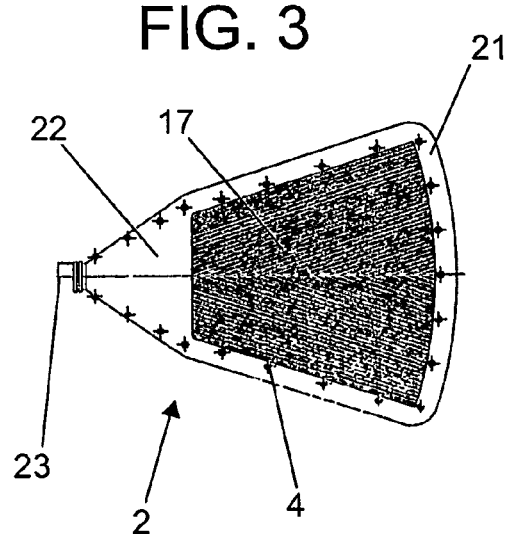
FIG. 3—Shows a frontal view of the grating element.
Figure 4:
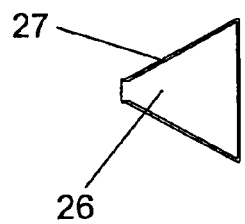
FIG. 4—Shows a frontal view of the triangular insert.
Figure 5:
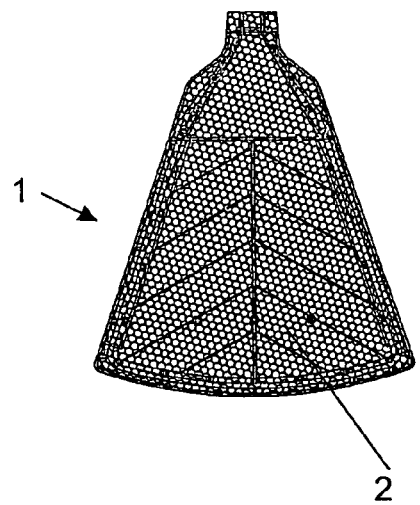
FIG. 5—Shows an upper view of the filtering sector, containing the grating element internal inserted.
Figure 6:
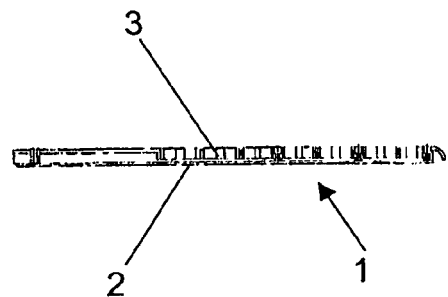
FIG. 6—Shows a cut side view of the filtering sector, containing the grating element internally.
Figure 7:
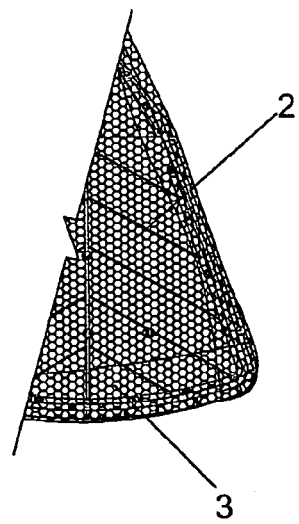
FIG. 7—Shows a blown cut perspective view of bias contained in the contour of the filtering sector, containing the grating element internally.
Figure 8:
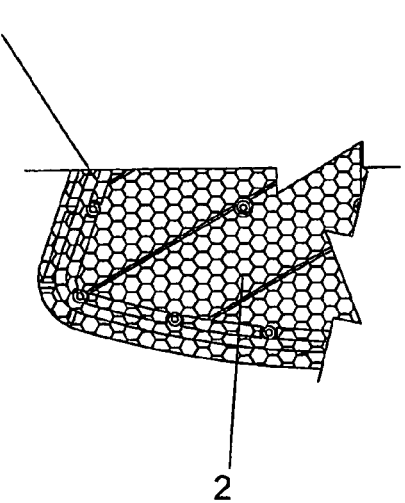
FIG. 8—Shows a blown cut view of the filtering sector, containing the grating element internally.
Figure 9:
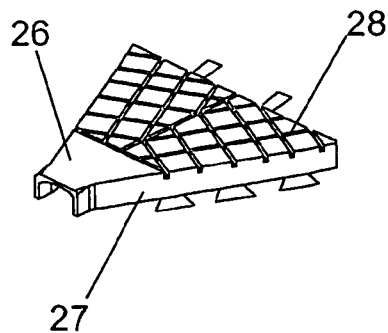
FIG. 9—Shows a lower view in insert perspective, in inverted position.
Figure 10:
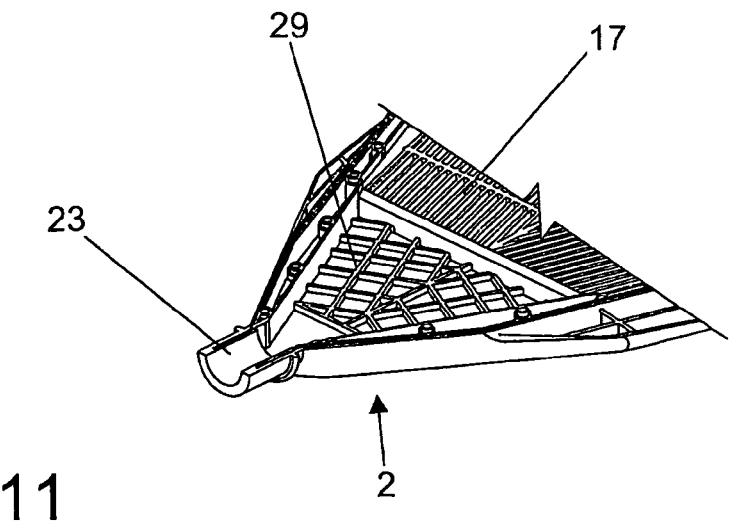
FIG. 10—Shows a perspective view of the internal portion of triangular portion of the grating element, in which the insert is fit.
Figure 11:
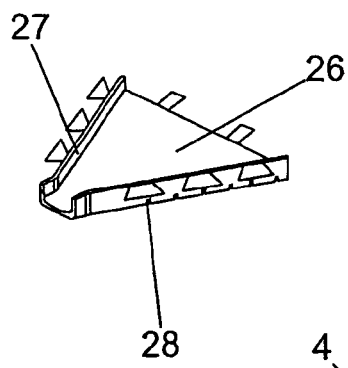
FIG. 11—Shows a perspective upper view of triangular insert.
Figure 12:
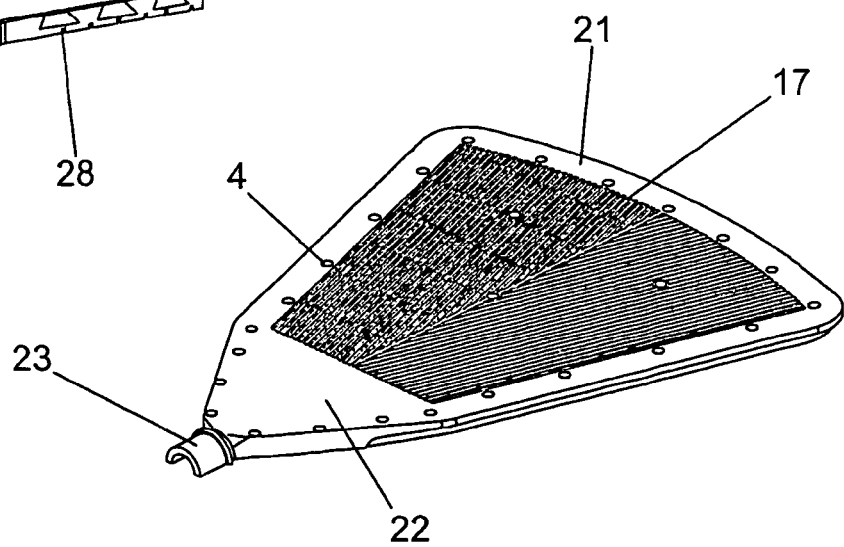
FIG. 12—Shows an external perspective view of the grating element.
Figure 13:
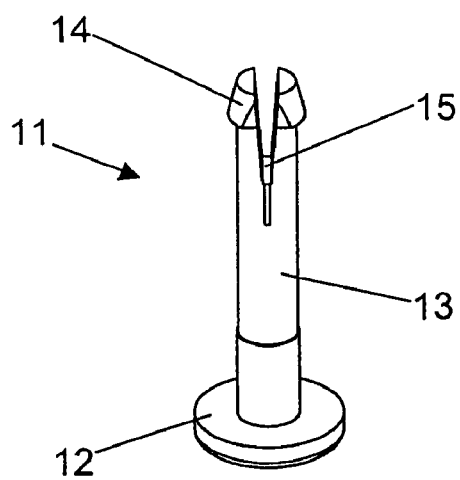
FIG. 13—Shows an upper perspective view of the blocking pin.
Figure 14:
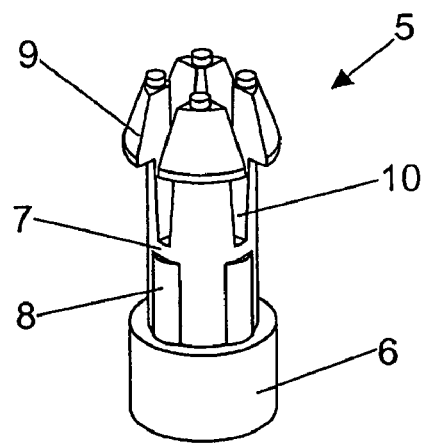
FIG. 14—Shows an upper perspective view of the self-blocking pin.
Figure 15:
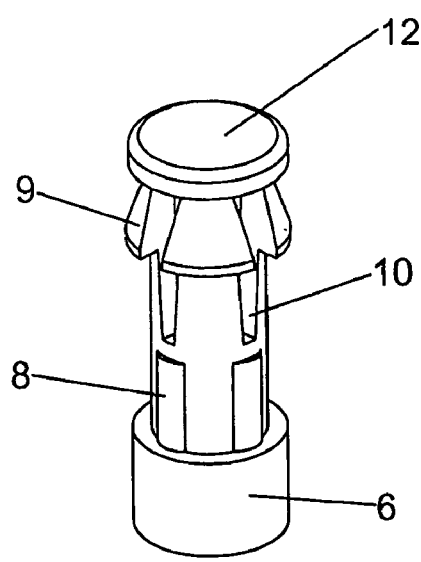
FIG. 15—Shows an upper perspective view of the self-blocking pin containing the blocking pin inserted.
Figure 16:
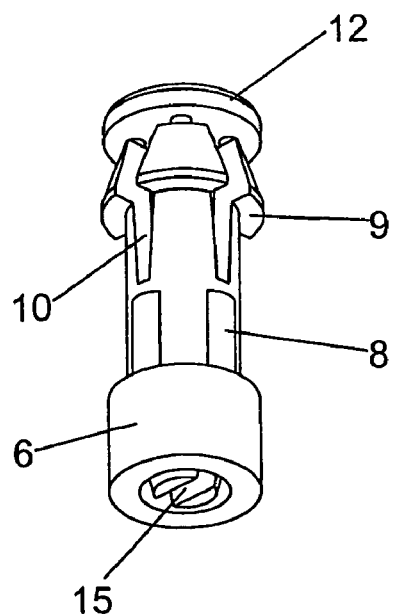
FIG. 16—Shows a lower perspective view of self-locking pin containing inserted the locking pin.
Figure 17:
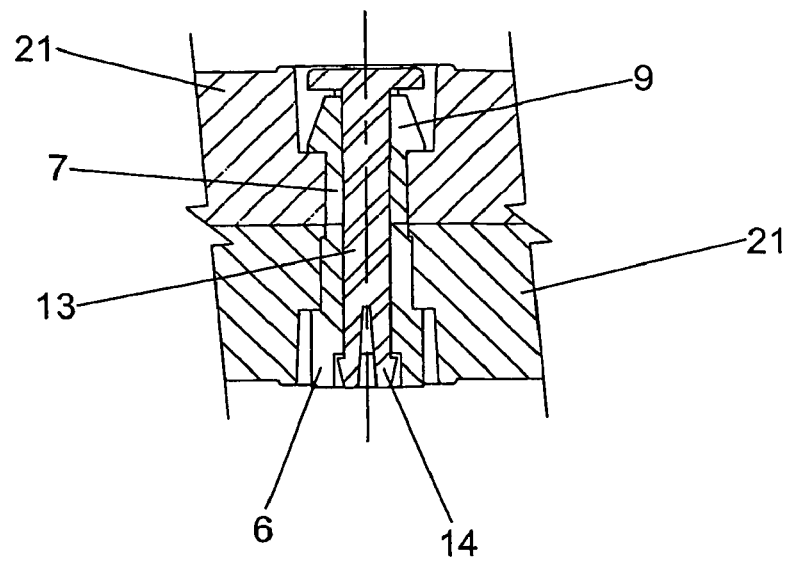
FIG. 17—Shows a cut view of the large edge, illustrating a self-locking pin containing the locking pin, inserted in one of the lowered cylindrical holes.
Figure 18:
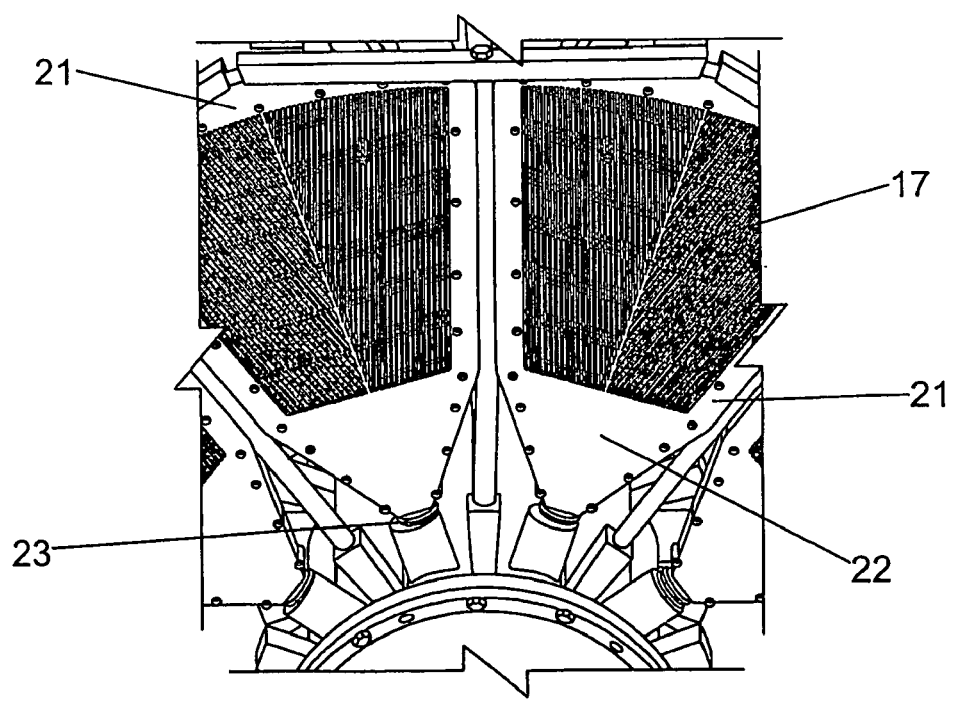
FIG. 18—Shows a partial view in perspective of the grating elements involved by the respective filtering sectors, assembled in the perforated cylindrical similar to the displacement of petals around the rotating element.
Figure 19:
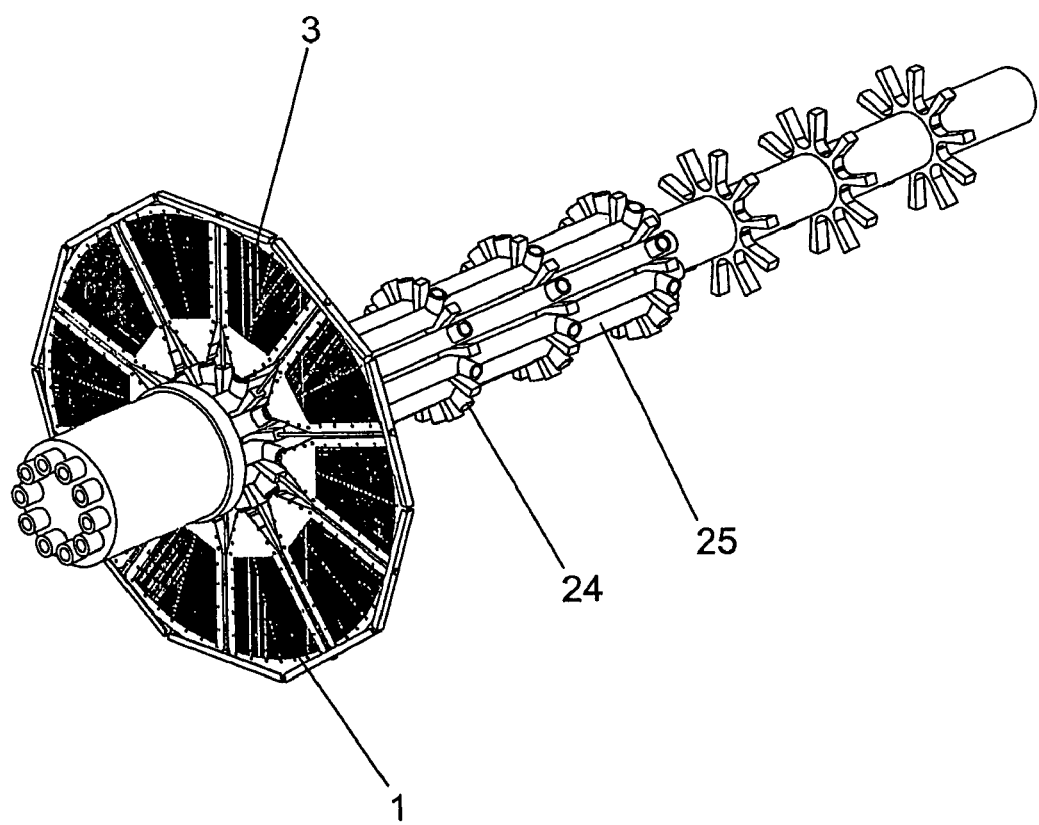
FIG. 19—Shows a perspective view of the rotating filter, containing partially assembled the grating elements involved by the respective filtering sectors, illustrated in filtering disc mounted without the bi-foliar permeable film elements (3).

In compliance with the illustration of figures above listed, the "SECTOR FOR VACUUM ROTATING FILTERS AND SIMILARS", object of the present patent, is characterized essentially because it deals with filtering sector (1) constituted of two grating elements (2), preferentially of a polymeric material high resistant to abrasion of mining products finely disperse in the filtrate drained through the bi-foliar permeable film element (3), which covers the grating elements (2).

The grating elements (2) are provided with lowered cylindrical holes (4) distributed along its extension, by where they are united among themselves through self-locking pins (5), constituted of a perforated cylindrical base (6) and internally lowered, from where a perforated (7) cylindrical body of smaller diameter is raised, being that the lower perimeter contains four reinforced saliencies (8) and the upper portion provided with a conic ring (9) and split longitudinally in four quadrants by means of splits (10), in addition to cylindrical elevation, downward from the upper end of each formed quadrant.

Each self-locking pin (5) receives in its upper portion a locking counter-pin (11), constituted of a cylindrical base (12) from where a massive cylindrical body of smaller diameter is raised (13), being the upper portion provided with a conic ring (14) and longitudinally and centrally split into two semi-part by means of a split (15).

Each grating element (2) is formed by a perimetral element (16), containing medianly solidary a big diagonal grid of segments (17) which has next to its surface an extended wavy body (18) in a longitudinal way, by means of rectangular elevation of rounded corners (19), forming a gallery (20) which, together, occupies the whole interstitial space of the grating element (2).

The perimeter element (16) is wedged solidary and perimetrally by a long edge (21), in a single body with triangular portion (22), solidary in turn to a semi-tubular segment (23), through which the set is fixed in the perforated cylindrical element (24) of the rotating filter (25), being that in the internal funneling of the grating elements (2) there are inserts displaced (26), preferentially elastomeric or polymeric of high resistance to abrasion of the minerals finely dispersed in the drained filtrate, being that such insert (26) contains brims (27) in its sided and reticulate veins (28) in its lower portion surface, coincident with the reticulate fitting (29) contained on the internal surface of the triangular portion (22).

This way, several filtering sectors (1) are fit radially around the tubular axle of the rotating filter, granting a clover format with several (petals) leaned among themselves, forming a single disc.

The insert (26) has the function to guide the percolated liquid through galleries (20) of the grating elements (2) into the semi-tubular segment (23), which in turn forwards the same liquid into the tubular axle of the filtered liquid collection.

However, the present utility model embodies the advantage of being more resistant to the wearing in the sewing area in the perimeter of thin parts and of the cylindrical projection lap displaced in the vertex of the thin permeable filtering sector.

It is possible, this way, to observe, through the exhibition that the referred "SECTOR FOR VACUUM ROTATING FILTERS AND SIMILARS", is characterized as utensil of great use, presenting as we can evidence by carried out analyzes and by the shown figures, several differences on the conventional models existing in the consumer market, in addition to the constructive and functional techniques completely different from those regarding the technique state.

By the offered advantages, and yet, by being covered with characteristics truly innovating which comply with all requirements of novelty and originality in the gender, the present "SECTOR FOR VACUUM ROTATING FILTERS AND SIMILARS", gathers conditions necessary to deserve the Invention Privilege.

Whereas the present request has been described with reference to the modality intended above, it will be apparent to the ones expert in the technique that other changes in the composition and details of the process can be carried out here, without getting far away from the spirit and scope required, as it is well defined in the enclosed claim.

The invention claimed is:

1. A sector for vacuum rotating filters or similar such devices, the sector comprising a filtering sector (1) constituted of two grating elements (2) of polymeric material highly resistant to abrasion of mining products finely disperse in a filtered liquid, a bi-foliar permeable element (3), which covers the two grating elements (2), said grating elements each further comprising a perimetral element (16) having a gallery (20) occupying an interstitial space of the grating element (2) and an insert (26) with a set of reticulate veins (28) coincident with a reticulate fitting (29) of the grating element (2).

2. The sector for vacuum rotating filters or similar such devices according to claim 1, wherein the grating elements (2) further comprise recessed cylindrical holes (4) distributed along a peripheral junction of the pair of grating elements (2) and a plurality of self-blocking pins (5), each of which receives internally, through its frontal end, a locking counter-pin (11).

3. The sector for vacuum rotating filters or similar such devices according to claim 2, wherein the locking counter-pin (11) further comprises a cylindrical base (12) from where a cylindrical body (13) extends, the cylindrical body (13) having a smaller relative diameter than the cylindrical base (12), the upper portion of the cylindrical body (13) provided with a conic ring (14) and longitudinal and centrally split into two portions by means of a split (15).

4. The sector for vacuum rotating filters or similar such devices according to claim 1, wherein each grating element (2) further comprises a perimeter element (16), characterized by a large edge (21) adapted for not enabling the formation of filtered paste between the sectors and centrally and solidly containing a grid of diagonal segments (17), not coincident with an alignment of filter elements contained in the fabric of the bi-foliar permeable film element (3).

5. The sector for vacuum rotating filters or similar such devices according to claim 1, wherein the perimeter element (16) is solidly united to a triangular portion (22), and in turn to a semi-tubular segment (23), through which the sector can be fixed in a perforated cylindrical element (24) of a rotating filter (25), wherein an internal funneling of the grating elements (2) inserts (26), contain an elastomeric or polymeric of high resistance to abrasion of the minerals finely disperse in the drained filtrate.

6. A sector for vacuum rotating filters or similar such devices, the sector comprising: two grating elements (2) of a polymeric material highly resistant to abrasion from mining products finely dispersed in a filtered liquid; a permeable film element (3) covering the grating elements; a plurality of recessed apertures (4) extending through the two grating elements along a peripheral junction of the grating elements; a plurality of self blocking pins (5) extending through the plurality of recessed apertures and uniting the grating elements, each self blocking pin (5) receiving internally, a locking counter pin (11), wherein the self-locking pin (5) being constituted of a perforated cylindrical base (6) and internally lowered, from where a perforated cylindrical body (7) of a lesser relative diameter than the base (6) extends, wherein a lower perimeter of the perforated cylindrical body (7) adjacent the base (6) contains four reinforced saliencies (8) and an upper portion is provided with a conic ring (9) and is longitudinally split into four quadrants by means of splits (10), in addition to a cylindrical, projection extending upward from the upper end of each formed quadrant.

* * * * *